US008515616B2

(12) United States Patent
Hering et al.

(10) Patent No.: US 8,515,616 B2
(45) Date of Patent: Aug. 20, 2013

(54) METHOD OF DIAGNOSING VEHICLE MALFUNCTION USING A TELEMATICS UNIT

(75) Inventors: Carl J. Hering, Farmington Hills, MI (US); Ryan M. Edwards, Macomb, MI (US)

(73) Assignee: General Motors LLC, Detroit, MI (US)

( * ) Notice: Subject to any disclaimer, the term of this patent is extended or adjusted under 35 U.S.C. 154(b) by 1301 days.

(21) Appl. No.: 12/059,639

(22) Filed: Mar. 31, 2008

(65) Prior Publication Data

US 2009/0248235 A1 Oct. 1, 2009

(51) Int. Cl.
*G01M 17/00* (2006.01)

(52) U.S. Cl.
USPC .................. 701/31.5; 701/31.4; 701/32.8

(58) Field of Classification Search
USPC ............... 701/29, 33, 29.1, 31.4, 31.5, 31.6, 701/34.3, 32.8
See application file for complete search history.

(56) References Cited

U.S. PATENT DOCUMENTS

| | | | | |
|---|---|---|---|---|
| 4,602,127 A * | 7/1986 | Neely et al. | | 379/68 |
| 6,289,332 B2 * | 9/2001 | Menig et al. | | 180/167 |
| 6,330,499 B1 * | 12/2001 | Chou et al. | | 701/33 |
| 6,535,743 B1 * | 3/2003 | Kennedy et al. | | 455/456.1 |
| 6,577,934 B2 * | 6/2003 | Matsunaga et al. | | 701/29 |
| 6,687,587 B2 * | 2/2004 | Kacel | | 701/33 |
| 6,728,612 B1 * | 4/2004 | Carver et al. | | 701/33 |
| 6,732,031 B1 * | 5/2004 | Lightner et al. | | 701/33 |
| 6,735,503 B2 * | 5/2004 | Ames | | 701/29 |
| 6,933,842 B2 * | 8/2005 | Oesterling et al. | | 340/539.24 |
| 7,092,799 B2 * | 8/2006 | Oesterling et al. | | 701/1 |
| 7,096,101 B2 * | 8/2006 | Sonnenrein et al. | | 701/31.5 |
| 7,142,959 B2 * | 11/2006 | Oesterling et al. | | 701/29 |
| 7,149,206 B2 * | 12/2006 | Pruzan et al. | | 370/349 |
| 7,454,273 B2 * | 11/2008 | Hoshaw | | 701/36 |
| 7,627,406 B2 * | 12/2009 | Wang et al. | | 701/33 |
| 2006/0122748 A1 * | 6/2006 | Nou | | 701/29 |

* cited by examiner

*Primary Examiner* — Darnell Jayne
*Assistant Examiner* — Sasha T Varghese
(74) *Attorney, Agent, or Firm* — Anthony L. Simon; Reising Ethington P.C.

(57) ABSTRACT

A method for providing diagnostic assistance to a driver of a vehicle when calling a call center following a diagnostic warning being displayed on the vehicle instrument panel. Upon establishing the call, indicator data representative of the warning is automatically sent to the call center where it is used to select one or more diagnostic tests targeted to particular vehicle systems associated with the warning. The test is carried out at the vehicle and the resulting diagnostic data sent back to the call center. The call is then switched to an advisor at the call center and the received diagnostic data is used to aid the advisor in providing the diagnostic assistance to the driver.

3 Claims, 3 Drawing Sheets

METHOD OF DIAGNOSING VEHICLE MALFUNCTION USING A TELEMATICS UNIT

TECHNICAL FIELD

The present invention relates generally to vehicle telematics systems and vehicle diagnostic systems and, more particularly, to methods for assisting call center advisors in diagnosing vehicle problems.

BACKGROUND OF THE INVENTION

Vehicle telematics service providers, also referred to herein as call centers, offer their customers a variety of services, including safety, navigation, and vehicle diagnostic services. The services can be delivered to the customer via an installed telematics unit within the customer's vehicle. For diagnostic assistance, such as when the driver is presented with a warning light, sound, or vehicle information center text message, these telematics services allow the driver to initiate a call into the call center and inquire as to the source and possible fix of the problem. In newer systems, the driver can identify the particular light, sound, or message to the advisor at the call center and, in response, the advisor can remotely initiate an over-the-air diagnostic test that covers all of the available vehicle system modules (i.e., all of the modules accessible to the vehicle's telematics unit that is in communication with the call center). The particular test used is somewhat dependent on the description that the driver provides to the advisor.

SUMMARY OF THE INVENTION

According to an aspect of the invention, there is provided a method of supplying data for use in providing diagnostic assistance to a vehicle. The method includes the steps of:

obtaining indicator data representative of vehicle diagnostic information that is presented via a vehicle instrument panel;

placing an occupant-initiated call to a call center using a telematics unit installed in the vehicle; and transmitting the indicator data via the call once it is established with the call center.

In accordance with another aspect of the invention, there is provided a method of processing a call received at a call center to provide diagnostic assistance to a vehicle. This method can utilize indicator data supplied from the vehicle and includes the steps of:

(a) receiving a call from a vehicle telematics unit;
(b) receiving data from the telematics unit via the call;
(c) processing the received data and identifying from it indicator data representative of vehicle diagnostic information that is presented via the vehicle's instrument panel;
(d) selecting a diagnostic test for one or more specific vehicle modules based on the indicator data; and
(e) transmitting a command to the vehicle telematics unit that initiates the diagnostic test on the specific vehicle module(s).

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 2:
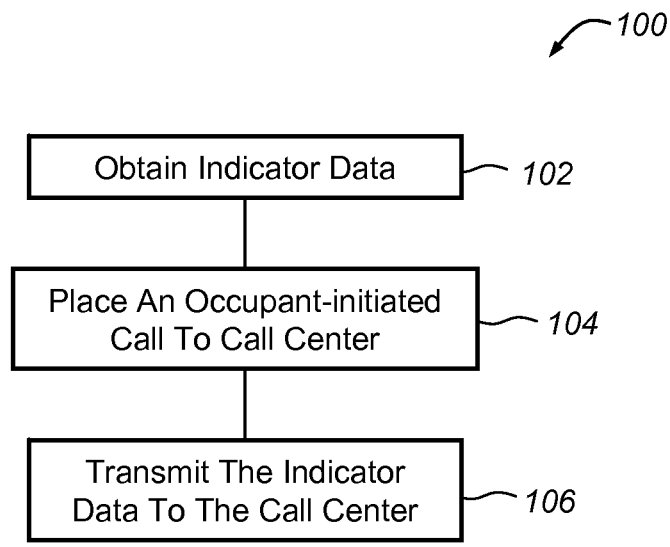
FIG. 2 is a flowchart depicting a method of supplying data for use in providing a vehicle with diagnostic assistance.
Figure 3:
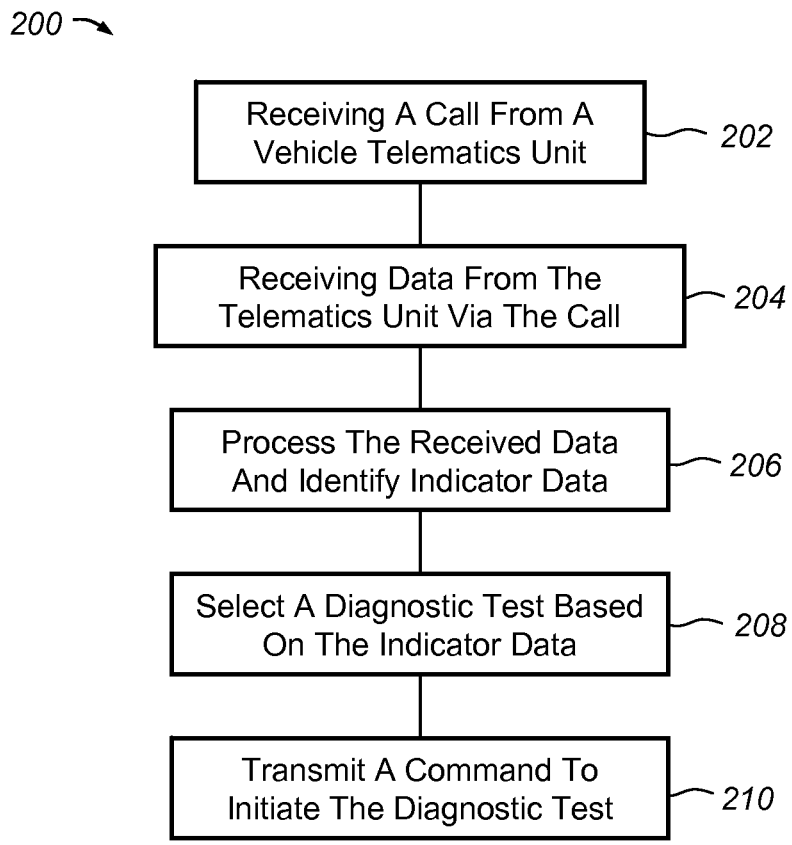
FIG. 3 is a flowchart depicting a method of processing a call received at a call center to provide diagnostic assistance to a vehicle.
Figure 4:
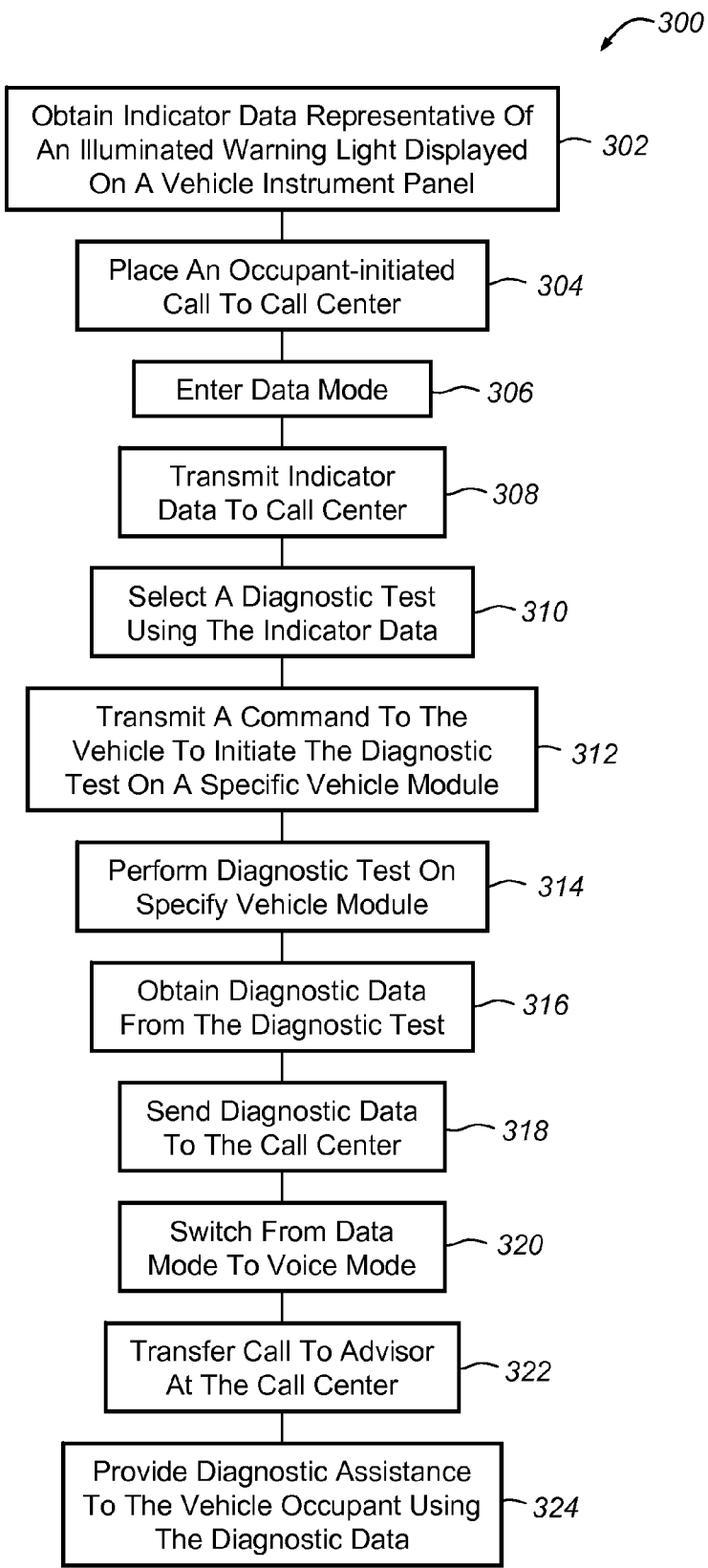
FIG. 4 is a flowchart depicting a method of providing diagnostic assistance to a vehicle.

The methods described below in connection with FIGS. 2-4 are directed to processes useful in providing diagnostic assistance to an occupant in a vehicle. They are particularly useful in providing an advisor at a call center with diagnostic information at the beginning of a service call received from the occupant, and they enable this information to be quickly and automatically obtained from the vehicle using one or more diagnostic tests carried out at the vehicle. In general, the disclosed methods involve obtaining and sending data at the beginning of a call from the occupant, using that data to select a diagnostic test that is targeted to the particular problem identified by the data, running the diagnostic test at the vehicle, and then providing the test results back to the call center for use by the advisor. All of this can be carried out in a matter of seconds at the outset of the call before it is connected to the advisor. As used herein, a "diagnostic test" can be, for example, a diagnostic query of a particular module for a particular diagnostic trouble code (DTC), or a memory readout of DTCs or other diagnostic data, or one or more sensor readings, or could be a more involved procedure that places various vehicle components in certain states and obtains resulting information that is used to diagnose the vehicle's condition.

Communications System—

Figure 1:
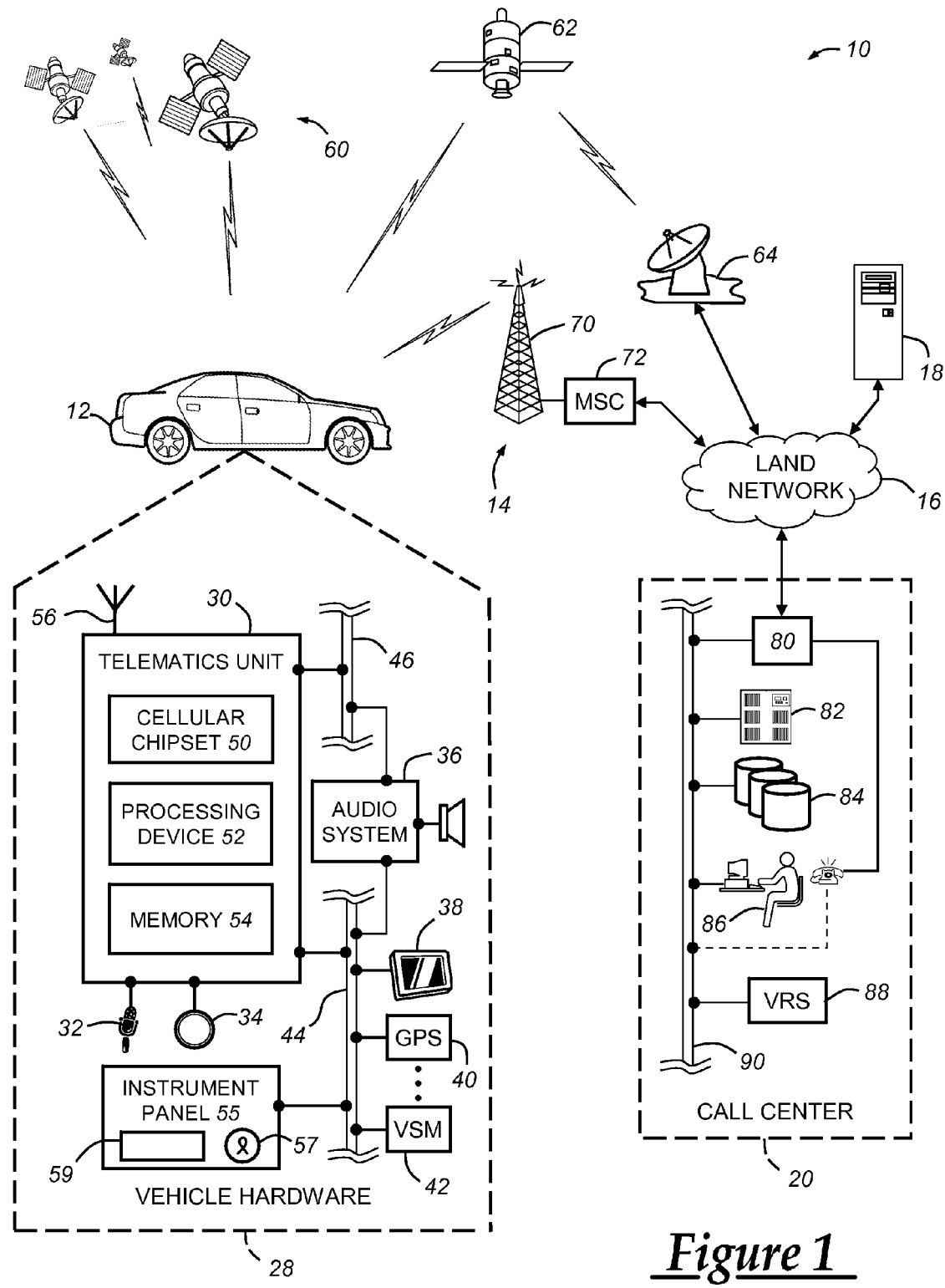
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the methods disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and include a telematics unit 30, a microphone 32, one or more pushbuttons or other control inputs 34, an audio system 36, a visual display 38, a GPS module 40, other vehicle system modules (VSMs) 42, and an instrument panel 55. Some of these devices can be connected directly to the telematics unit such as, for example, the microphone 32 and pushbutton(s) 34, whereas others are indirectly connected using one or more network connections, such as a communications bus 44 or an entertainment bus 46.

Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also include a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel 55 or a heads-up display reflected off of the windshield, and can be used to provide a multitude of input and output functions. Various other vehicle user interfaces can also be utilized, as the interfaces of FIG. 1 are only an example of one particular implementation.

Although visual display 38 is depicted separately from instrument panel 55, as noted above it can be incorporated into the instrument panel. The visual display 38 itself can comprise an information center that provides various textual and/or graphical messages to the driver. Apart from visual display 38, the vehicle instrument panel 55 can include a variety of other user interface elements such as various illuminable warning lights 57, gauges, and sound output devices 59 such as a buzzer or speaker. Also, any of the other vehicle electronics 28 shown in FIG. 1 can be incorporated into the instrument panel 55. Data from the different VSM's 42 can be supplied to instrument panel 55 so that, for example, the triggering of a DTC at an engine control module can be reported to the instrument panel to cause illumination of a check engine light (CEL) or to cause the display of a suitable message on visual display 38. Various approaches for accomplishing this are known to those skilled in the art. For example, where instrument panel 55 is connected to a vehicle bus (e.g., communications bus 44), the appropriate messages can be sent via the vehicle bus to the instrument panel where they are used to set the CEL. As another example, where the CEL is directly hardwired to a controller, it can be illuminated simply via a signal. In either event, indicator data is used to cause the particular warning to be presented at the instrument panel 55. As used herein, "indicator data" is any data such as signals or bus messages that are used to cause a warning to be presented via the instrument panel 55.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.
Method—

Turning now to FIG. 2, there is shown a method 100 of supplying data for use in providing diagnostic assistance for a vehicle. This method can be carried out using the system 10 of FIG. 1 or using any other suitable means of communicating between vehicle 12 and call center 20. Method 100 begins with the step 102 of obtaining indicator data at the vehicle that is representative of an illuminated warning light 57 or of other vehicle diagnostic information presented via the vehicle instrument panel 55. The types of diagnostic information that can be presented via the instrument panel can vary widely from one vehicle model to the next depending on such things as the number of diagnostic warning lights incorporated into the instrument panel display and whether or not the vehicle is equipped with a visual display 38 or other information center that displays textual information to the driver. For example, on a vehicle having only a check engine light (CEL), but no information center, the CEL might be illuminated to indicate an exhaust system problem such as an out-of-range reading on an $O_2$ sensor, whereas on a vehicle equipped with an information center, a more specific message concerning the exhaust problem can be displayed textually. In either case, presentation of the warning is carried out by supplying indicator data to the instrument panel.

As will be appreciated by those skilled in the art, the indicator data can be obtained through a variety of ways and may depend on the particular vehicle electrical system used on a particular model. Where communications bus 44 is used, the indicator data can be obtained by monitoring the bus for messages that contain or represent the indicator data. This can be done by telematics unit 30—or by some other vehicle system module if desired. Alternatively, where the instrument panel or other vehicle system has memory that stores the indicator data, then this data can be obtained by accessing and reading the appropriate memory location. Preferably, the indicator data provides some information about the nature of the problem for which the driver is receiving some warning—for example, that it relates to engine operation versus the ABS system; however, it can also be something more basic such as a flag that indicates whether a particular instrument panel light 57 is on or off.

At step 104, the telematics unit 30 places an occupant-initiated call to the call center 20. This call can be initiated by the driver via pushbutton 34 and may be being placed to the call center because of the instrument panel warning or for some completely unrelated reason. Step 102 can be carried out either before, during, or after step 104. For example, the indicator data can be obtained at the time the warning is first presented via the instrument panel or it can be obtained at the time the call is placed. Where the data is obtained in advance of the call, it can be temporarily stored in memory such as in the telematics unit memory 54.

Once the call is established, the indicator data is transmitted to the call center, as indicated by step 106. Transmission can be carried out in any suitable manner. For example, where wireless carrier system 14 is a cellular telephony network using CDMA, the telephone call can initially be established in a data mode in which the indicator data transmitted over the call is encoded in a manner that permits its successful transmission via the CDMA's voice channel. Techniques for transmitted data via a CDMA voice channel are known. Where other types of telephony are used, the data can be transmitted in a manner appropriate for the particular type of communication used so that, for example, where VoIP is used, the indicator data can be sent as packetized data. Furthermore, the indicator data can be sent in the form in which it was received, or in various other forms, such as by encoding it into a bit pattern that is then sent to the call center.

With reference now to FIG. 3, there is shown the method 200 carried out at the call center to provide diagnostic assistance to a vehicle. This method 200 can be carried out in response to the call made from the vehicle during the FIG. 2 method. The method 200 begins at step 202 where the call center receives a call from a vehicle telematics unit. Once the call center answers this call, then at step 204 it receives data from the telematics unit via the call. Then, at step 206, the received data is processed to identify from it the indicator data transmitted by the telematics unit at step 106 of method 100. Again, this indicator data is representative of vehicle diagnostic information that is presented via the vehicle's instrument panel 55 and can be any of a variety of different types of data and can be supplied to the call center in different forms, such as raw data, or data that is encoded in a bit pattern, encrypted, etc. Once the indicator data is identified from the received data, then at step 208 one or more diagnostic tests are selected using that indicator data. These diagnostic test(s) can be targeted to one or more specific vehicle modules so that diagnostic probing is only carried out on a subset of the complete group of accessible vehicle system modules. For example, where the indicator data signifies an out-of-range $O_2$ sensor reading, a diagnostic test of the engine and/or exhaust system can be run, without the need to perform diagnostic testing of unrelated vehicle systems such as the ABS system. Once the appropriate diagnostic test(s) have been selected, a command is sent to the vehicle to initiate the chosen test(s). This is shown at step 210. The command can be one that initiates a diagnostic test already stored on the vehicle; for example, a test that acquires all DTCs for one or more vehicle systems. Alternatively, rather than initiating a test stored on the vehicle, this step 210 can include sending the test itself to the vehicle. The test can be sent in whatever form is suitable for the particular vehicle involved. For example, it can be a script or executable code that is run by the telematics unit processor 52. The test(s) can also be ones run by a vehicle system module other than telematics unit 30.

Although not shown in FIG. 3, the method can include additional steps at the call center; for example, steps in which the results of the diagnostic test(s) are used to help an advisor at the call center provide additional diagnostic assistance to the vehicle driver. For this purpose, the resulting data from the test(s) can be transmitted back to the call center where it is received and provided to the advisor so that the advisor can supply the driver or other vehicle occupant with more specific information about the cause of the warning that was presented via the instrument panel. Apart from providing the diagnostic result itself, the received data can be used to automatically look up additional diagnostic information that is provided to the advisor for use in providing the diagnostic assistance to the driver. For example, the diagnostic results can be used to provide the advisor with suggestions that can be passed onto the driver to provide him or her with recommendations as to how to address the cause of the CEL or other warning—suggestions such as to schedule dealer servicing or to reset a particular vehicle system or system function.

Turning now to FIG. 4, there is shown one particular embodiment 300 of a method for providing diagnostic assistance to a vehicle. This method 300 is intended to assist an advisor at a call center in providing diagnostic assistance to a driver who calls the call center via an installed telematics unit during circumstances in which a diagnostic indicator light on the vehicle's instrument panel is illuminated. Furthermore, the method 300 is particularly useful for vehicle communications systems that utilize cellular telephony with the vehicle and call center being configured to switch between a data mode for communication of data and a voice mode for communication of speech. Thus, the method can be carried out using the communication system 10 of FIG. 1, or other suitable systems. The method begins at step 302 where indicator data representative of the illuminated warning light is obtained at the vehicle. This data can be obtained in any suitable manner, one example being to obtain the data by monitoring signals sent to the vehicle instrument panel and then extracting or otherwise obtaining the indicator data from the monitored signals. At step 304, the telematics unit places an occupant-initiated call to the call center, and this can be in response to the driver or other occupant either initiating the call by, for example, pressing pushbutton 32 or initiating the call by responding in the affirmative to an automatic query by the vehicle to place the call as a result of the warning light being illuminated. As discussed above, in connection with FIG. 2, steps 302 and 304 can be carried out in any order.

Upon establishing the call with the call center, then at step 306 the telematics unit and call center enter a data mode in which non-speech data can be wirelessly sent and received between the two facilities. In a CDMA-based system, this data mode can be one in which the transmitted data is first modulated onto a carrier using a modulation technique that enables successful transmission of the data via a vocoder used in the CDMA hardware. Such techniques are known to those skilled in the art. The vehicle then carries out steps 308-318 while the telematics unit and call center are in the data mode. First, the indicator data is transmitted to the call center or other remote facility, step 308. Then, at least one diagnostic test is selected using the indicator data, step 310. This diagnostic test is targeted to one or more specific vehicle modules and the selection of the test can be done at the call center or other remote facility. At step 312, a command is transmitted to the vehicle to initiate the diagnostic test on the specific vehicle module(s) associated with the test(s). The telematics unit receives the command and either carries out the diagnostic testing itself, or passes the command onto either the module to be probed or to a separate diagnostic module responsible for carrying out diagnostic testing. This is indicated at step 314. The command can be received from the call center or other remote facility. As discussed in connection with FIG. 3, this command can either initiate a diagnostic routine prestored on the vehicle or can include (or be) the diagnostic test itself that is sent to the vehicle from the call center or other remote facility. Then, at step 316 diagnostic data resulting from the diagnostic test(s) is obtained and at step 318 this data is then sent to the call center.

Once the diagnostic testing is complete at the vehicle, the call is switched from the data mode to a voice mode which permits speech transmission between the occupant who initiated the call and a live or automated advisor at the call center. This switch between modes is done at step 320 and can be carried out automatically by the vehicle and call center without any occupant or call center advisor involvement. When the switch to voice mode is carried out, the call is also transferred at the call center to an advisor, step 322. As will be appreciated by those skilled in the art, in many cases the steps 306-322 can be carried out in a matter of seconds immediately following establishment of the call and can be entirely transparent to the occupant who placed the call and to a live advisor who received the call at the call center. Finally, the advisor provides diagnostic assistance to the occupant using the diagnostic data resulting from the test(s) step 324. This assistance can be merely informational, or can include suggestions or recommendations as to how to address the vehicle condition that gave rise to the indicator light being illuminated. The assistance can be provided by a live advisor or automaton. For example, where an automaton is used, the diagnostic data can be used to lookup one or more of a number of predefined audio responses describing the vehicle condition and the audio response(s) then being sent to the occupant either as recorded audio or synthesized speech. As another example, where the call is transferred to a live advisor, the diagnostic data could be displayed in a window on the advisor's computer screen, or could be used to lookup additional diagnostic information that is then displayed on the advisor's screen. Other such examples will become apparent to those skilled in the art.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of providing diagnostic assistance to a vehicle, comprising the steps of:
   (a) obtaining indicator data representative of an illuminated warning light displayed on a vehicle instrument panel;
   (b) placing an occupant-initiated call to a call center using a telematics unit installed in the vehicle;
   (c) entering a data mode with the call center when the call is established between the telematics unit and call center and then carrying out the following steps (c1)-(c6);
   (c1) transmitting the indicator data to the call center via the call;
   (c2) identifying a diagnostic test for one or more specific vehicle modules using the indicator data; and
   (c3) transmitting a command to the vehicle telematics unit that initiates the diagnostic test on the vehicle module(s);
   (c4) carrying out the diagnostic test at the vehicle on the vehicle module(s);
   (c5) obtaining diagnostic data resulting from the diagnostic test; and
   (c6) sending the diagnostic data to the call center;
   (d) switching from the data mode to a voice mode with the call center and carrying out the following steps (d1)-(d2);
   (d1) transferring the call to an advisor at the call center; and
   (d2) providing diagnostic assistance to the vehicle occupant using the diagnostic data.

2. The method of claim 1, wherein step (a) further comprises the step of monitoring signals sent to the vehicle instrument panel and obtaining the indicator data from the monitored signals.

3. The method of claim 1, wherein the advisor is a live advisor and wherein step (d2) further comprises displaying diagnostic assistance information on a computer being used by the advisor.

* * * * *